(12) United States Patent
Chou

(10) Patent No.: US 6,533,179 B1
(45) Date of Patent: Mar. 18, 2003

(54) GUARDING SYSTEM OF A CREDIT CARD AGAINST UNAUTHORIZED USE

(76) Inventor: Ling-Yun Chou, 16Fl., No. 40, Guofu Rd., Fengshan City, Kaohsiung (TW)

( * ) Notice: Subject to any disclaimer, the term of this patent is extended or adjusted under 35 U.S.C. 154(b) by 0 days.

(21) Appl. No.: 10/099,598

(22) Filed: Mar. 13, 2002

(51) Int. Cl.$^7$ .............................................. G06K 19/06
(52) U.S. Cl. ....................................... 235/492; 235/380
(58) Field of Search ................................. 235/492, 380

(56) References Cited

U.S. PATENT DOCUMENTS 5,578,808 A * 11/1996 Taylor ........................ 235/492

* cited by examiner

Primary Examiner—Harold I. Pitts
(74) Attorney, Agent, or Firm—Alan Kamrath; Rider, Bennett, Egan & Arundel, LLP

(57) ABSTRACT

A guarding system of a credit card against unauthorized use includes one or more sets of letter-and-number series composed of letters and numbers stored in a credit card, and the same letter-and-number series as those of the credit card are set up in the data archives of the computer of a credit card issuing bank. The computer of the credit card issuing bank checks whether or not the letter-and-number series of the credit card coincide with those in its archives and deciding whether to allow the trading finished or not. Besides, the computer of the credit card issuing bank can automatically renew the letter-and-number series of the credit card every time after it is finished in trading. Then, these renewed data are checked and stored in the credit card and in the archives of the computer, surely preventing the credit card from copied and used by illegally and fraudulently.

1 Claim, 1 Drawing Sheet

GUARDING SYSTEM OF A CREDIT CARD AGAINST UNAUTHORIZED USE

BACKGROUND OF THE INVENTION

This invention relates to a guarding system of a credit card against unauthorized use, particularly to one in which the data stored in a credit card will synchronously and automatically be replaced by the computer of a credit card issuing bank every time when a credit card is finished in trading. Thus, even if a credit card is faked, this faked credit card cannot be used because its data do not coincide with those renewed by the credit card issuing bank, surely preventing a credit card from copied and used fraudulently.

In accordance with the statistical data issued by the United Credit Card Center, in the year of 2001, Taiwan is next to none among Asian countries in "the fraud-loss basic point" of credit cards, and the loss of the amount of money due to faked credit cards makes a record last year. Especially, the rate of the fraud-loss basic point of credit cards is doubled up to four thousandths from May to August in the year 2001.

Credit card traders say that the "fraud-loss basic point" of credit cards is usually maintained less than one thousandth in most credit card markets, but amazingly Taiwan is four times surpassing the other credit card markets in the world. Besides, bankers find that the time-limited efficacy of unauthorized use of credit cards by fraud is becoming faster and faster. In the past, the group of using illegally credit cards by fraud used to spend two or three days using up the amount of money of a credit card, but nowadays it takes only one day to do that. Therefore, the problem of how to prevent credit cards from faked and illegally used by fraud must be solved as soon as possible.

According to statistics, the probability of illegally using credit cards by fraud in most rations in the world is around seven ten thousandths, but it is up to three thousandths in Taiwan, which is four times more than an average value in the world, that is, among ten thousand credit card holders, thirty holders' credit cards have been used by fraud. According to the statistics issued by the largest five international credit card issuing organizations, the sum paid by faked credit cards in Taiwan is up to NT$0.3 billion in the year 2000, which is $4.1/1000$ of the total amount of the credit cards used, with a rate of crime in faking credit cards and using them by fraud being next to none in Asian regions. In addition, the skill of committing crime in faking credit cards in a small amount is being developed into faking credit cards in a large amount by means of chips, and these faked credit cards are sold to indefinite persons for using by fraud, consequently increasing difficulty of prevention.

At present, a credit card is provided with a set of fixed word series as a code, which is confirmed by the bank computer for judging whether to carry on trading or not. In this case, so long as the code of a credit card is copied by fraud to duplicate a new credit card, illegally using credit cards by fraud is easy and unpreventable.

SUMMARY OF THE INVENTION

The objective of the invention is to offer a guarding system of a credit card against unauthorized use, in which one or more sets of letter-and-number series composed of letters and numbers are stored in the credit card, and the credit card issuing bank also has the same letter-and-number series as those of the credit card set up in its data archives. Thus, when a credit card is used in trading, the computer of the credit card issuing bank will check whether or not the data of the letter-and-number series of the credit card being used coincide with those in its data archives, and judge whether to let the trading carried on or not after confirmed. Besides, every time after the credit card is finished trading, the letter-and-number series of the credit card will synchronously and automatically be renewed by the computer of the credit card issuing bank, and then checked and stored in the data archives, achieving effect of preventing a credit card from illegally used by fraud.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
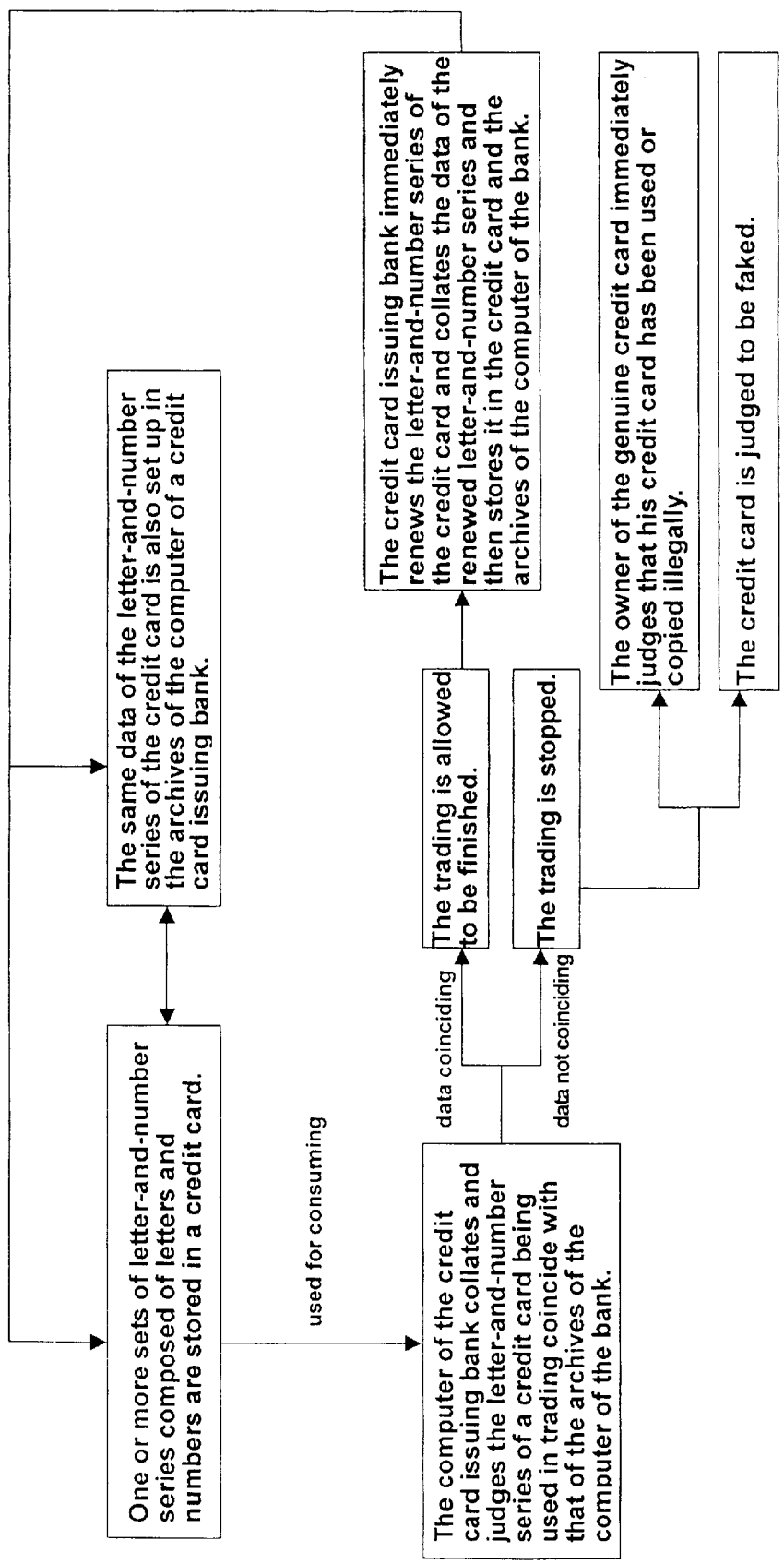
FIG. 1 is a block diagram of the flowing processes of a guarding system of a credit card against unauthorized use in the present invention.

A preferred embodiment of the guarding system of a credit card against unauthorized use in the present invention, as shown in FIG. 1, includes the following processes.

1. A new column is designed in the magnetic device or electronic element of a credit card for storing one or more sets of letter-and-number series made up of letters and numbers.
2. One or more sets of the same word series as those of the credit card are set up in the data archives of the computer of a credit card issuing bank.
3. Every time when the credit card is finished in trading, the data of the letter-and-number series in this credit card and the same data in the data archives of the computer of the credit card issuing bank will synchronously and automatically be renewed by the computer of the credit card issuing bank accordingly, and these new data serving as the new code of the credit card are stored and in the credit card and in the data archives of the computer for future collation.
4. Every time when a credit card is used for trading, the computer of the credit card issuing bank will automatically carry on checking whether or not the data of letter-and-number series of the credit card being used coincide with those in its data archives to confirm if the data of the credit card being used coincide with the replaced data of letter-and-number series in the computer after the credit card was finished trading last time. In case two data are checked identical, trading can be allowed, but in case of being not identical, the trading is stopped.
5. It is evident that the credit card is copied by fraud if trading is stopped due to the code of the credit card not coinciding with the data stored in the computer of the credit card issuing bank. Under such condition, some necessary measure can timely be taken to prevent faked credit cards from used illegally and continually.
6. Another circumstance is that it is easy for a businessman to know that the credit card failing in trading is faked, and he can protect the sum of a genuine credit card from losing by fraud, because the data of letter-and-number series of the faked credit card do not coincide with those renewed in the genuine credit card. Further, if a genuine credit card is often used in trading for a small sum, then this genuine credit card can be guarded against copied and illegally used by fraud when it is employed for trading.

I claim:

1. A guarding system of a credit card against unauthorized use comprising:

a new column arranged in a magnetic device or electronic element of a credit card for storing one or more sets of letter-and-number series made up of letters and numbers;

a data column for the same letter-and-number series as those of said credit card, said data column set up in the data archives of the computer of a credit card issuing bank; and, data of said letter-and-number series of said credit card and said data in said data archives of said computer synchronously and automatically renewed by said computer of said credit card issuing bank every time after said credit card is finished in trading, said renewed data checked and stored in said credit card and said data archives of said computer, said computer of said credit card issuing bank automatically carrying on checking whether or not said letter-and-number series stored in said credit card coinciding with said letter-and-number series in said data archives every time when said credit card is used in trading, said guarding system of said credit card surely able to prevent said credit card from copied and used by illegally and fraudulently.

* * * * *